United States Patent [19]

Shoup et al.

[11] 4,221,578

[45] Sep. 9, 1980

[54] METHOD OF MAKING CONTROLLED-PORE SILICA STRUCTURES FOR HIGH TEMPERATURE INSULATION

[75] Inventors: Robert D. Shoup; William J. Wein, both of Corning, N.Y.

[73] Assignee: Corning Glass Works, Corning, N.Y.

[21] Appl. No.: 11,503

[22] Filed: Feb. 12, 1979

[51] Int. Cl.$^2$ ............................................. C04B 35/14
[52] U.S. Cl. .......................................... 65/22; 65/31; 264/44; 264/45.3
[58] Field of Search ................. 65/22, 31; 264/42, 44, 264/45.3

[56] References Cited

U.S. PATENT DOCUMENTS

| | | | |
|---|---|---|---|
| 3,743,601 | 7/1973 | Rao et al. | 65/22 X |
| 3,929,439 | 12/1975 | Pierce | 65/22 |
| 4,112,032 | 9/1978 | Blaszyk et al. | 264/44 X |

*Primary Examiner*—Arthur D. Kellogg
*Attorney, Agent, or Firm*—Clinton S. Janes, Jr.

[57] ABSTRACT

This invention is concerned with the production of porous, essentially alkali metal-free amorphous bodies demonstrating excellent thermal insulating properties and being capable of long term use at temperatures up to 1000° C. The bodies exhibit an average pore diameter of between about 100Å–10,000Å with at least 80% of the pores coming within ±20% of the average pore diameter value. The bodies consist essentially, as expressed in weight percent on the oxide basis, of 0.25–5% of an infrared radiation absorbing metal oxide, 1–10% of an infrared radiation scattering metal oxide, and the remainder $SiO_2$.

2 Claims, No Drawings

METHOD OF MAKING CONTROLLED-PORE SILICA STRUCTURES FOR HIGH TEMPERATURE INSULATION

BACKGROUND OF THE INVENTION

Very efficient, high temperature, silica-containing insulating materials exhibiting a thermal conductivity less than that of still air have been made commercially available. In the main, those products have resulted from powder technology developed for cryogenic and space applications. The forming process for such products has been a rather tedious one involving mixing finely-powdered, aerogel silica with radiation opacifier oxides, fiber reinforcement, and binder, and then pressing or slip casting the resultant mixture into a low density slab which is relatively weak. Thus, the forming process contemplates the handling problems inherent with low density powders and is ill-suited to fabricate bodies of intricate configurations.

OBJECTIVE OF THE INVENTION

The primary objective of the present invention is to provide a method for forming silica-containing insulating materials exhibiting high temperature capabilities and very low thermal conductivity, which method does not require powder technology and which permits the fabrication of articles of essentially infinite geometries.

PRIOR ART

U.S. Pat. No. 3,678,144 discloses the manufacture of porous silica-containing bodies. That process involved three steps. First, a solution having a pH between 10-15 and containing about 1-12 moles $SiO_2$/liter in solution was prepared from silicate solutions selected from the group of alkali metal silicates, quaternary ammonium silicate, colloidal silica, and mixtures thereof. Second, a water soluble compound of a metal oxide was added to the solution. Third, an organic compound was reacted therewith selected from the group of formaldehyde, paraformaldehyde, formamide, glyoxal, methyl formate, ethyl formate, methyl acetate, and ethyl acetate which will cause the silica to polymerize, thereby resulting in a coherent, porous, gelled body wherein the added metal oxide is intimately bound to the silica network.

U.S. Pat. No. 4,112,032 describes a modification and an improvement upon the previous disclosure in that coherent, porous, silica-containing gelled bodies are produced wherein the size of the pores can be carefully controlled. Such bodies are obtained through the gelation of carefully delineated mixtures composed of sodium silicate with colloidal silica, potassium silicate with colloidal silica, and mixtures composed of sodium and/or potassium silicate with quaternary ammonium silicate. Uniformity in pore size is achieved such that at least 80% of the pores fall within ±20% and, preferably, within ±10% of the average pore diameter.

The patent also discloses the production of porous silica-containing bodies of closely-controlled pore size wherein particulate material having a grain size passing a 200 mesh United States Standard Sieve was incorporated therein.

SUMMARY OF THE INVENTION

The present invention has its basis in, and is an improvement upon, the disclosure of U.S. Pat. No. 4,112,032. The inventive method effects the development of a novel product exhibiting exceptional insulating characteristics. The superior insulating properties displayed by the bodies of the instant invention are founded upon three factors: first, thermal transport in the solid phase is limited through the use of oxides having low intrinsic thermal conductivity; second, diffusion of thermal energy in the gas phase is limited by forming bodies having a closely-controlled average pore diameter which is equal to or less than the mean free path of the gaseous molecules; and, third, thermal transport by radiation is limited by the inclusion of radiation scattering materials and heat absorbing materials, known collectively as radiation opacifiers. The articles of this invention have the further desirable property of high thermal stability, which permits long term use at temperatures up to 1000° C.

The foundation of the present invention lies in the ability to produce a porous body of silica (having an intrinsically low thermal conductivity) of very closely-controlled fine pore size (100 Å–10,000 Å) to inhibit gaseous diffusion. Pore size control is of especial significance in insulating materials to insure maximum inhibition of gaseous diffusion and resistance to flow of thermal energy across pore walls. Therefore, the products of the instant invention will demonstrate such porosity that more than 80% of the pores will fall within ±20% of the average pore diameter.

The inventive method comprises six general steps:

First, an aqueous potassium silicate solution and a colloidal silica solution, each exhibiting a pH between 10-15 and containing about 1-12 moles $SiO_2$/liter in solution, are prepared.

Second, those materials are mixed together to form a homogemeous solution;

Third, radiation scattering and heat absorbing materials in powder form, i.e., as particles passing a 200 mesh United States Standard Sieve (74 microns), are blended into the solution to provide a uniform mixture throughout;

Fourth, the silica is polymerized utilizing a gelation agent selected from the group consisting of formaldehyde, paraformaldehyde, formamide, glyoxal, methyl formate, ethyl formate, methyl acetate, and ethyl acetate to form a coherent, porous, gelled structure;

Fifth, the gelled structure is contacted with a weak acid or weak base solution, i.e., having a pH between about 5-10, to remove excess potassium ions therefrom; and Sixth, the leached body is dried and fired.

In the preferred inventive embodiment, short length fibers of inorganic or organic materials are also incorporated into the mixture along with the powders. In general, these fibers will have dimensions ranging about 0.125"–1.5" in length, preferably about 0.5" in length. The fibers should demonstrate good dispersability so as to provide a homogeneous presence in the gel.

Although operable compositions of potassium silicate and colloidal silica solutions can obviously vary over a broad range, the commercially-available preparations listed below were employed as a matter of convenience and constitute the preferred starting materials for the invention. The compositions thereof are reported in terms of weight percent:

Potassium silicate —8.3% $K_2O$, 20.8% $SiO_2$, balance $H_2O$
colloidal silica —40% $SiO_2$, balance $H_2O$ Oxides such as titania ($TiO_2$) and zirconia ($ZrO_2$) demonstrate high indices of refraction for energy in the infrared region of the radiation spectrum and constitute the preferred agents for scattering radiant energy.

Oxides such as ferrous oxide (FeO) and chromous oxide (CrO) are exceptionally absorbing of radiation within the infrared portion of the spectrum and, therefore, comprise the preferred agents for absorbing radiant energy.

The presence of fibrous material has been found particularly useful as added reinforcement for the porous bodies. Such additions have been especially valuable in bodies of large dimensions. For example, the appearance of cracks was quite prevalent in 12"×12"×1" slabs upon heating to 950° C. when no fiber reinforcement was included. Short washed fibers, i.e., free of fines, having lengths of about 0.125"×0.5" and diameters of about 2 microns of an aluminosilicate composition, marketed by the Carborundum Company under the trademark FIBERFRAX®, have proved eminently suitable for this purpose. Since the primary purpose of the fibers is to reinforce the bodies during initial heat up, thermallydecomposable fibers of organic material, e.g., paper, can be considered with concomitant economics in starting materials.

To insure adequate mechanical strength coupled with a controlled pore diameter between about 100 Å–10,000 Å, i.e., of a size to inhibit thermal transfer by gaseous diffusion, the relative amounts of colloidal silica and potassium silicate in solution must be held within stringent limits. Hence, with respect to the potassium silicate and colloidal silica solutions set out above, the weight ratio thereof can range between about 3:1 to 1:9. Where a weight ratio of potassium silicate solution to colloidal silica solution is about 1:9, fibrous reinforcement must be present to supply practical strength to the body.

In general, the amounts of infrared radiation scatterers and absorbers and, where present, reinforcing fibers will total less than about 20% of the weight of the silica-containing solution. The quantity of the infrared radiation absorber will commonly not exceed about 5% by weight, the total of the infrared radiation scatterers will customarily not exceed about 10%, and the total of reinforcing fibers will not exceed about 15% by weight. Greater amounts will provide operable final products but the physical characteristics of the final products can be significantly altered. For example, the strength of the products can be enhanced through additions of fibers up to about 50% but the thermal conductivity thereof can be severely reduced. On the other hand, low conductivity fibers such as $TiO_2$ and $ZrO_2$ can provide substantial inhibition of thermal flow even at loadings up to 50%. However, the costs of such additions are sufficiently high and the degree of strength improvement is not of such moment as to render them economically attractive.

Formamide constitutes the preferred gel reagent since it is more conveniently handled than formaldehyde, paraformaldehyde, glyoxal, methyl formate, methyl acetate, ethyl formate, and ethyl acetate. Normally, the amount of gelation agent will range between about 15-15% by weight of the silicacontaining solution.

It will be recognized that potassium silicate and colloidal silica solutions having concentrations of $K_2O$ and $SiO_2$ differing from those present in the above-cited starting materials will be operable in the invention when utilized in the proper amounts to yield $K_2O$ and $SiO_2$ contents equivalent to those supplied by the latter materials.

The following examples depict the fabrication of circular insulation units which have been conceived as containers for heating elements useful for flat top cooking appliances. The bodies have a diameter of about 7½" and a thickness of about 1".

EXAMPLE I

About 980 grams of the above potassium silicate solution were blended into 420 grams of the above colloidal silica solution with strong agitation at room temperature. The addition was begun dropwise and in a thin stream with the final amount. The time for this mixing to insure a homogeneous solution varied between about 5-10 minutes. Approximately 140 grams of formamide were slowly added at room temperature, the solution again being subjected to strong agitation to avoid localized gelation. This addition step required about 2-5 minutes. Thereafter, with vigorous stirring, 28 grams of $TiO_2$ powder, 2.8 grams of $Fe_3O_4$ ($FeO.Fe_2O_3$) powder, [those powders passing a 200 mesh United States Standard Sieve (74 microns)], and 36 grams of FIBERFRAX® fibers were blended into the mixture at room temperature. The final mixture was then stirred sufficiently to secure maximum dispersion until incipient gelation caused the viscosity thereof to increase enough to resist settling of the solids. At room temperature, the mixture was sufficiently viscous to be poured after about two hours. If desired, the mixture can be heated gently (preferably not over about 45° C.) which reduces the time before pouring to about 30 minutes, depending upon the quantity of solution being heated and the heating rate.

Aluminum blocks which had been cut to allow for about 5% linear shrinkage of the gelled body through the firing step comprised the molds for the insulation units. The molds were sprayed with a clear acrylic plastic (KRYLON®), marketed by the Krylon Department of Borden, Inc., Columbus, Ohio, to prevent sticking of the poured body to the mold. The slurry was poured into the molds where it was permitted to gel at room temperature. Commonly, a gel time of about three hours was observed before removal of the mold. Gelation will take place at any temperature between the freezing point and boiling point of the mixture. Heating of the mixture serves to expedite gelation and the time required for gelling can be reduced to 30 minutes and less by heating the viscous slurry to about 40°-45° C. However, where elevated mold temperatures are employed during the gelation step, a more temperature-stable mold release agent than the acrylic plastic KRYLON® will be required.

The gelled body demonstrated no deformation when removed from the mold in preparation for a leaching treatment even though still in the wet state and highly porous. In general, the body should be maintained in a wet condition after removal from the mold since cracking will frequently occur during the leaching step if previously allowed to dry. The body was immersed into a 1 molar ammonium nitrate ($NH_4NO_3$) solution having an initial pH of about 5 and a temperature of about 90° C. The principal purpose for the leaching process is to reduce the alkali content in the body, thereby greatly improving the temperature durability of the porous silica structure. Thus, the desire is to achieve an essentially alkali metal-free body. The leaching can be accomplished with water but weak acid solutions (pH ranging down to about 4) appear more effective and are unquestionably more rapid in operation. Inasmuch as the leaching proceeds more rapidly at elevated temperatures, the solutions therefor will commonly be maintained at temperatures approaching the boiling point thereof although, of course, temperatures approaching the freezing point of the solutions are operable, but slowly. In the preferred embodiment, the alkali content of the body is reduced below 0.1% by weight.

After the leaching step, the body is dried and fired. Normally, the body is heated to about 50°–90° C., i.e., to an elevated temperature below 100° C., and maintained thereat for a time sufficient to remove unbonded water from the pores. The time required for drying is obviously dependent upon the bulk of the body and the temperature utilized. Room temperature drying can be employed but self-evidently will involve much longer exposure times. The use of microwave or dielectric drying has been found to be very effective technique for this initial drying step. After preliminary drying, the body was fired at about 200°–300° C./hour to temperatures between about 900°–1100° C. and held thereat for about 1–4 hours. Assuming reasonably good elimination of bulk water during the preliminary drying step, the heatup rate in the firing step does not appear to be critical, although some cracking is hazarded if the body is plunged directly into a furnace operating at the firing temperature. Rapid cooling of the fired body does not appear to cause any unusual thermal shock problems.

A body fired at 950° C. for three hours exhibited a porosity of 76%, a bulk density of about 22.8 lbs/ft$^3$, a thermal conductivity at 126° F. of 0.43 BTU in/hr ft$^2$°F., and very uniform average pore size, i.e., more than 80% of the pores had diameters falling within ±20% of 1100 Å. Measurements of pore size were conducted in accordance with conventional mercury-intrusion porosimetry techniques.

After firing at 950° C. for one week, the body showed no cracks, negligible shrinkage above that which is customary to initial heatup, no change in pore size distribution, and no formation of cristobalite (a polymorph of silica). Exposure of a duplicate body at 1050° C. for one week led to some distortion and surface cracking thereof, but the basic coherent structure was not adversely affected. Despite some sintering that took place and the formation of a minor amount of cristobalite, the pore distribution was essentially unchanged.

These bodies manifest a pronounced tendency to pick up water if exposed to the ambient atmosphere after the preliminary drying step. Hence, bodies dried at 90° C. absorbed about 5% by weight water after standing at room temperature for 24 hours. However, following the three-hour firing at 950° C., water pickup by the body was negligible even after several weeks' exposure to the ambient atmosphere.

A series of slabs was prepared with varying pore diameters to be measured for thermal conductivity. An addition of FIBERFRAX ® fibers for reinforcement was made to each to insure essentially crack-free bodies.

EXAMPLE II

Approximately 800 grams of formamide were slowly added to 8000 grams of potassium silicate with the mixture being strongly agitated through stirring. To preclude localized gelation, stirring was continued until the particles dissolved. Approximately 80 grams of FIBERFRAX ® fibers were added to this solution with the vigorous stirring produced by a Waring Blender. The stirring was accompanied by gentle heating such that the viscosity of the solution was increased sufficiently to prevent settling out of the dispersed phase. The mixture was thereafter poured into a steel mold having the dimensions of 18"×18"×2" which was coated with plastic or wax to prevent sticking of the gel. The mixture was allowed to rest in the mold overnight at room temperature to gel. (It will be appreciated that heating of the mixture can reduce the gel time to a few hours). The gelled mixture was heated to about 80° C. for about three hours to seek maximum polymerization and densification.

The gelled body was removed from the mold and then leached, dried, and fired at 950° C. in accordance with the procedures described above in Example I. The resulting product exhibited a density of about 25.5 lbs/ft$^3$, an average pore diameter of about 5000 Å, and a thermal conductivity at 400° F. of 0.691 BTU in/hr ft$^2$°F. and at 125° F. of 0.634 BTU in/hr ft$^2$°F.

EXAMPLE III

To approximately 800 grams of colloidal silica were slowly added about 7200 grams of potassium silicate with vigorous stirring. After stirring for several minutes, and while still at room temperature, about 800 grams of formamide were slowly added to the solution with continued stirring. Upon achieving homogeneity in the solution, about 88 grams of FIBERFRAX ® fibers were added and uniformly blended in. With gentle heating, stirring was continued until the viscosity was such as to prevent settling out of the dispersed phase. The mixture was then poured into a steel mold coated to prevent sticking of the gel and left to set overnight at room temperature. Thereafter the temperature was gradually raised to about 80° C. and held there for about three hours.

The body was taken from the mold and then leached, dried, and fired at 950° C. as outlined above in Examples I and II. The product demonstrated a density of about 25 lbs/ft$^3$, an average pore diameter of about 3600 Å, and a thermal conductivity at 400° F. of 0.633 BTU in/hr ft$^3$°F. and at 125° F. of 0.550 BTU in/hr ft$^2$°F.

EXAMPLES IV–VII

Porous bodies were prepared in the manner described above in Examples I–III and the compositions thereof along with the physical and structural properties displayed thereby are recorded in Tables A and B.

TABLE A

| | | Amounts of Ingredients Used | | | |
| --- | --- | --- | --- | --- | --- |
| Example No. | Average Pore Diameter | Potassium Silicate | Colloidal Silica | FIBERFRAX ® Fibers | Formamide |
| II | 5000Å | 8000g | | 80g | 800g |
| III | 3600Å | 7200g | 800g | 88g | 800g |
| IV | 1900Å | 6400g | 1600g | 96g | 800g |
| V | 1100Å | 5600g | 2400g | 104g | 800g |
| VI | 500Å | 4800g | 3200g | 112g | 800g |

TABLE A-continued

| Example No. | Average Pore Diameter | Amounts of Ingredients Used | | | |
|---|---|---|---|---|---|
| | | Potassium Silicate | Colloidal Silica | FIBERFRAX® Fibers | Formamide |
| VII | 300Å | 2500g | 2500g | 75g | 500g |

TABLE B

| Example No. | Average Pore Diameter | Density lbs/ft² | Conductivity (BTU in/hr ft² °F.) | |
|---|---|---|---|---|
| | | | 125° F. | 400° F. |
| II | 5000Å | 25.5 | 0.634 | 0.691 |
| III | 3600Å | 25.0 | 0.550 | 0.633 |
| IV | 1900Å | 24.1 | 0.520 | 0.614 |
| V | 1100Å | 24.1 | 0.448 | 0.599 |
| VI | 500Å | 23.8 | 0.384 | 0.536 |
| VII | 300Å | 28.3 | 0.448 | 0.533 |

A series of three silica bodies of controlled pore size, i.e., at least 80% of the pores coming within ±20 of the average pore diameter value, was prepared wherein each contained fiber reinforcement, two opacifiers ($TiO_2$ and $Fe_3O_4$), and a surfactant for aiding uniform dispersion of the additions.

EXAMPLE VIII

While stirring vigorously, 500 grams of formamide were added slowly at room temperature to 5000 grams of potassium silicate. Thereafter, 50 grams of FIBERFRAX® fibers were added by means of a Waring-type blender. In a separate container, 100 grams of powdered $TiO_2$ and 10 grams of powdered $Fe_3O_4$ were mixed with 10 grams of Daxad 30 (a surfactant marketed by W. R. Grace Co. of Cambridge, Massachusetts) in just enough water to be pourable. This mixture was blended into the formamide-silicate-fiber mixture with stirring. The resulting mixture was stirred continuously and gently heated until the viscosity thereof became great enough to prevent settling out of the dispersed phases. The mixture was then poured into a mold, having the dimensions of 18"×18"×2" and which had been coated with a plastic to inhibit sticking of the gel, and the mixture allowed to gel overnight at room temperature. In the morning the temperature was raised to 80° C. and held for three hours.

The body was subsequently extracted from the mold and then leached, dried, and fired at 950° C. utilizing the procedures of Examples I–VII above. The final body exhibited a density of about 28.3 lbs/ft³, an average pore diameter of about 5600 Å, and a thermal conductivity at 400° F. of 0.697 BTU in/hr ft²°F. and at 125° F. of 0.652 BTU in/hr ft²°F.

EXAMPLE IX

With strong agitation, 4000 grams of potassium silicate were slowly added to room temperature to a vessel containing 1000 grams of colloidal silica. After a few minutes of mixing, 500 grams of formamide were slowly blended into that solution, again with strong agitation. When the resultant solution appeared to be free of possible gel particulates, 60 grams of FIBERFRAX® fibers were dispersed therein at room temperature utilizing a Waring-type blender. In a separate container, 100 grams of $TiO_2$ powder and 10 grams of $Fe_3O_4$ powder were dispersed in an amount of water just sufficient to be pourable with the aid of 10 grams of Daxad 30. This slurry was poured into the above-described silicate mixture accompanied with strong stirring. The stirring was continued and the combined mixture gently heated until the viscosity thereof was sufficiently great to prevent settling out of the dispersed materials. The mixture was thereafter poured into a steel mold, which had been coated to inhibit sticking of the gel, and allowed to gel overnight at room temperature. The material was then heated to 80° C. and maintained at that temperature for three hours to insure essentially complete gelation.

The body was removed from the mold and then leached, dried, and fired at 950° C. in like manner to the above-outlined examples, yielding a controlled-pore structure that was coherent, free from cracking, and which demonstrated a density of about 22.3 lb/ft³, an average pore diameter of about 2000 Å, and thermal conductivities at 400° F. and 125° F., respectively, of 0.563 and 0.514 BTU in/hr ft²°F.

EXAMPLE X

The product of Example X was prepared in accordance with the procedure of Example IX but utilizing 2000 grams of colloidal silica, 3000 grams of potassium silicate, 70 grams of FIBERFRAX® fibers, 100 grams of $TiO_2$ powder, and 10 grams of $Fe_3O_4$ powder. The resultant body displayed a coherent, controlled-pore structure having a density of about 25 lbs/ft³, an average pore diameter of about 500 Å, and thermal conductivities at 400° F. and 125° F., respectively, of 0.448 and 0.382 BTU in/hr ft²°F.

Tables C and D report the compositions of and the physical and structural characteristics of Examples VIII–X, thereby providing a ready comparison therebetween.

TABLE C

| Example No. | Average Pore Diameter | Amounts of Ingredients Used | | | | | |
|---|---|---|---|---|---|---|---|
| | | Potassium Silicate | Colloidal Silica | FIBERFRAX® Fibers | Formamide | $TiO_2$ | $Fe_3O_4$ |
| VIII | 5600Å | 5000g | — | 50g | 500g | 100g | 10g |
| IX | 2000Å | 4000g | 1000g | 60g | 500g | 100g | 10g |
| X | 500Å | 3000g | 2000g | 70g | 500g | 100g | 10g |

TABLE D

| Example No. | Average Pore Diameter | Density lbs/ft³ | Conductivity (BTU in/hr ft² °F.) | |
|---|---|---|---|---|
| | | | 125° F. | 400° F. |
| VIII | 5600Å | 28.3 | 0.652 | 0.697 |
| IX | 2000Å | 22.3 | 0.514 | 0.563 |
| X | 500Å | 25.0 | 0.382 | 0.448 |

The conductivity data recorded in Tables B and D clearly illustrate the effect of pore size inhibition of gaseous conduction. For example, as can be seen from Examples II–VI, both at 125° F. and 400° F. conductivity decreases with pore size in the fiber-reinforced silica samples although the overall density of the bodies was relatively constant. However, Example VII, containing pores averaging 300 Å in diameter, did not comply with the trend. This reversal in behavior is postulated to be due to the dramatic increase in density demonstrated by the Example. Thus, whatever decrease in gaseous conduction was promoted by the smaller pore size was more than offset by the higher thermal conduction taking place through the solid phase.

A like trend of thermal conductivity decreasing with decreasing pore size is also evident in the products containing $TiO_2$ and $Fe_3O_4$ as radiation opacifiers (Examples I and VIII–X). It can further be observed that the radiation opacifiers exhibit little effect at 125° F. because of the lack of substantial infrared radiation at that temperature. Nevertheless, at 400° F. the radiation opacifiers display significant inhibition of infrared radiation transfer. Hence, the thermal conductivity values are seen to be substantially lower in those products containing $TiO_2$ and $Fe_3O_4$ than in those consisting of fiber-reinforced silica only.

As has been observed above, the inclusion of organic and/or inorganic fibers which are inert to the precursor silica-containing solutions and the gel reagent constitutes the preferred practice to impart reinforcement to the gelled bodies. The presence of such fibers also acts to inhibit the formation of cracks during the firing step, thereby permitting faster firing schedules. A level of about 5–15% by weight of the body (corresponding to about 1–2% by volume of the precursor solution) has been demonstrated to by quite effective. Where the aluminosilicate FIBERFRAX ® fibers are employed, about 10% by weight appears to be optimum.

Although the presence of even minuscule amounts of infrared radiation scatterers such as $TiO_2$ and $ZrO_2$ and infrared radiation absorbers such as FeO and CrO is useful, to be truly effective for the designed purpose the infrared radiation scatterer should be present in an amount ranging between about 1–10% by weight and the infrared absorbers in amounts varying between about 0.25–5% by weight.

In summary, the present invention is founded in the discovery that thermal diffusion in the gas phase can be regulated by controlling the pore size of open cell structures in the presence or absence of radiation opacifiers, providing the density of the product is maintained relatively constant. Thus, the thermal conductivity of the inventive products will generally be less than about 0.70 BTU in/hr ft$^2$°F. at 400° F.

We claim:

1. A method for making a porous, essentially alkali metal-free, amorphous body exhibiting a thermal conductivity less than about 0.70 BTU in/hr ft$^2$°F. at 400° F. and capable of long term use at temperatures up to 1000° C., wherein the average pore diameter ranges between about 100 Å–100,000 Å and at least 80% of the pores fall within ±20% of the said average pore diameter value, which comprises:

(a) preparing solutions having a pH between 10–15 and containing about 1–12 moles $SiO_2$/liter in solution of potassium silicate and colloidal silica;

(b) combining those solutions at a temperature between the freezing and boiling points thereof in the proper proportions equivalent to a weight ratio of 3:1 to 1:9 potassium silicate solution to colloidal silica solution wherein said potassium silicate solution consists essentially, by weight, of 8.3% $K_2O$, 20.8% $SiO_2$, balance $H_2O$, and said colloidal silica solution consists essentially, by weight, of 40% $SiO_2$, balance $H_2O$;

(c) adding thereto an amount of an infrared radiation absorbing metal oxide selected from the group of FeO and CrO sufficient to constitute 0.25–5% by weight of the body, an amount of an infrared radiation scattering metal oxide selected from the group of $TiO_2$ and $ZrO_2$ sufficient to constitute 1–10% by weight of the body, both of said metal oxides being in the form of inert particulate materials passing a No. 200 United States Standard Sieve, and an amount of organic and/or inorganic fibers having length dimensions between about 0.125"–1.5" sufficient to constitute up to 15% by weight of the body to impart reinforcement and inhibit the formation of cracks during the subsequent firing steps, the total of said infrared radiation absorbing metal oxide, said infrared radiation scattering metal oxide, and said organic and/or inorganic fibers being less than 20% by weight of the body;

(d) reacting an organic compound therewith selected from the group consisting of formaldehyde, paraformaldehyde, formamide, glyoxal, methyl formate, methyl acetate, ethyl formate, ethyl acetate, and mixtures thereof at a temperature between the freezing and boiling points of the solution for a sufficient length of time to polymerize the silica into a coherent, porous, amorphous gelled body;

(e) leaching said gelled body with a weak acid solution (pH down to 4) at a temperature between the freezing and boiling points of said solution;

(f) drying said gelled body at a temperature below about 100° C.; and (g) firing said dried body at a temperature between about 900°–1100° C.

2. A method according to claim 1 wherein said organic compound is formamide.

* * * * *

UNITED STATES PATENT AND TRADEMARK OFFICE
CERTIFICATE OF CORRECTION

PATENT NO. : 4,221,578
DATED : September 9, 1980
INVENTOR(S) : Robert D. Shoup and William J. Wein It is certified that error appears in the above-identified patent and that said Letters Patent are hereby corrected as shown below:

Column 2, line 35, change "homogemeous" to --homogeneous--.

Column 3, line 62, change "15-15%" to --5-15%--.

Column 9, line 33, change "by" to --be--.

Signed and Sealed this

Sixteenth Day of December 1980

[SEAL]

Attest:

SIDNEY A. DIAMOND

Attesting Officer

Commissioner of Patents and Trademarks